(12) United States Patent
Chauveau et al.

(10) Patent No.: US 8,007,919 B2
(45) Date of Patent: Aug. 30, 2011

(54) COEXTRUSION BINDER OF CO-GRAFTED POLYETHYLENE AND POLYPROPYLENE DILUTED IN A NON-GRAFTED POLYETHYLENE

(75) Inventors: Jerome Chauveau, Evreux (FR); Fabrice Chopinez, Evreux (FR); Arnaud Gerbaulet, Evreux (FR); Jean-Laurent Pradel, Boisney (FR)

(73) Assignee: Arkema France, Colombes (FR)

( * ) Notice: Subject to any disclaimer, the term of this patent is extended or adjusted under 35 U.S.C. 154(b) by 452 days.

(21) Appl. No.: 11/915,450

(22) PCT Filed: May 23, 2006

(86) PCT No.: PCT/FR2006/001185
§ 371 (c)(1),
(2), (4) Date: May 21, 2008

(87) PCT Pub. No.: WO2006/125913
PCT Pub. Date: Nov. 30, 2006

(65) Prior Publication Data
US 2009/0246533 A1 Oct. 1, 2009

(30) Foreign Application Priority Data

May 26, 2005 (FR) ..................................... 05 05306

(51) Int. Cl.
*B32B 27/38* (2006.01)
*C08L 51/06* (2006.01)

(52) U.S. Cl. .......... 428/500; 428/416; 428/476; 525/71; 525/78; 525/77

(58) Field of Classification Search ................... 428/515, 428/516
See application file for complete search history.

(56) References Cited

U.S. PATENT DOCUMENTS

| 4,906,690 | A | | 3/1990 | Hasenbein et al. | |
|---|---|---|---|---|---|
| 6,113,998 | A | * | 9/2000 | Aizawa et al. | 428/35.9 |
| 6,746,738 | B1 | * | 6/2004 | Le Roy et al. | 428/35.7 |
| 2006/0093764 | A1 | * | 5/2006 | Mehta et al. | 428/35.2 |
| 2006/0173089 | A1 | * | 8/2006 | Jackson et al. | 522/109 |

FOREIGN PATENT DOCUMENTS

| EP | 0742236 | 4/1996 |
|---|---|---|
| WO | WO9961246 | 5/1999 |

* cited by examiner

*Primary Examiner* — Hoa (Holly) Le
*Assistant Examiner* — Ronak Patel
(74) *Attorney, Agent, or Firm* — Thomas F. Roland

(57) ABSTRACT

The invention concerns a coextrusion binder comprising a mixture of at least one ethylene homo- or copolymer (A1) of density ranging between 0.940 and 0.980 g/cm$^3$ with at least one propylene homo- or copolymer (B), said mixture being grafted by at least one functional monomer and optionally diluted in at least one non-grafted ethylene homo- or copolymer (A2) of density ranging between 0.940 and 0.980 g/cm$^3$; the grafting rate of said coextrusion binder being less than 0.5% wt. % based on the total weight of said binder; the density of said tie ranging between 0.940 and 0.980 g/cm$^3$. The invention also concerns a structure comprising said type of binder as well as its use.

13 Claims, No Drawings

US 8,007,919 B2

COEXTRUSION BINDER OF CO-GRAFTED POLYETHYLENE AND POLYPROPYLENE DILUTED IN A NON-GRAFTED POLYETHYLENE

FIELD OF THE INVENTION

The present invention relates to a coextrusion binder or tie based on a blend of cografted polyolefins.

It relates more precisely to a blend, useful as a coextrusion tie, of at least one high-density polyethylene (abbreviated to HDPE) (A1) and of at least one propylene homopolymer or copolymer (B), the (A1)/(B) blend being grafted by a functional monomer and optionally diluted in ungrafted high-density polyethylene (abbreviated to HDPE) (A2). The percentage of grafted monomer in the tie is >0.05% and <0.5%, more advantageously >0.10% and <0.4% (percent of the total weight of the tie) whether (A2) is present or absent in the tie.

BACKGROUND OF THE INVENTION

Three-layer coatings are commonly used to protect the outer surface of metal pipes intended for constructing pipelines for oil or gas. These coatings are made up as follows, starting from the metal surface:
primer: epoxy resin
reactive tie, which reacts with the epoxy
polyethylene, advantageously medium-density or high-density polyethylene.
The tie described in document WO 99/61246 comprises:
(A) 50 to 100 parts of a polyethylene homopolymer or copolymer of relative density equal to 0.9 or higher;
(B) 0 to 50 parts of a polymer chosen from a polypropylene homopolymer or copolymer (B1), the amount of (A) and (B) being 100 parts and the (A)/(B) blend being grafted by at least 0.5% by weight of a functional monomer. This blend is itself diluted in at least one polyethylene homopolymer or copolymer (C).

The technical problem is to create a novel tie having a high peel strength at temperatures above 80° C. for preferential use in a pipe coating incorporating structures comprising at least one HDPE or MDPE layer. The tie must also be sufficiently fluid to facilitate its processing with a level of grafting <0.5%, preferably less than <0.4%, by weight relative to the total weight of the tie.

SUMMARY OF THE INVENTION

The Applicant will demonstrate that, for the type of tie according to the invention, the density (between 0.940 and 0.980 g/cm$^3$) of the tie plays an essential role in the adhesion at low temperature and at high temperature. The tie according to the invention makes it possible to achieve the following levels of adhesion: unpeelable at room temperature, and with a peel force greater than 100 N/cm at 80° C. under conditions mentioned below.

Among the structures of the invention, those relating to metal surfaces are particularly useful. The present invention is useful for polyethylene-coated metal surfaces and more particularly pipes, the outer surface of which is coated with MDPE or HDPE.

The present invention also relates to a multilayer structure made up of a layer that includes the above tie and, directly attached to said layer, a layer of a nitrogen-containing or oxygen-containing polar resin, such as a layer (E) of a polyamide resin, of an ethylene/vinyl acetate saponified copolymer, of a polyester resin, of a mineral oxide deposited on a polymer, such as PE, polyethylene terephthalate, EVOH, or else a metal layer.

One subject of the invention is a coextrusion tie comprising a blend of at least an ethylene homopolymer or copolymer (A1) of density between 0.940 and 0.980 g/cm$^3$ with at least one propylene homopolymer or copolymer (B), said blend being grafted by a functional monomer and optionally diluted in an ungrafted ethylene homopolymer or copolymer (A2) of density between 0.940 and 0.980 g/cm$^3$:
the level of grafting of said coextrusion tie being <0.5% by weight relative to the total weight of said tie; and
the density of said tie being between 0.940 and 0.980 g/cm$^3$.

According to one embodiment, the tie is characterized in that the level of grafting is >0.05% and <0.5% by weight relative to the total weight of said tie.

According to one embodiment, the tie is characterized in that the level of grafting is <0.4% by weight relative to the total weight of said tie.

According to one embodiment, the tie is characterized in that the level of grafting is >0.10% and <0.4% by weight relative to the total weight of said tie.

According to one embodiment, the tie is characterized in that the density of (A1) is between 0.940 and 0.980 g/cm$^3$.

According to one embodiment, the tie is characterized in that the density of (A2) is between 0.940 and 0.980 g/cm$^3$.

According to one embodiment, the tie is characterized in that the density of (A1) and/or of (A2) is between 0.945 and 0.960 g/cm$^3$.

According to one embodiment, the tie is characterized in that the density of (B) is between 0.860 and 0.920 g/cm$^3$.

According to one embodiment, the tie is characterized in that (A1) and (A2) are the same polymers.

According to one embodiment, the tie is characterized in that it comprises:
99.5 to 80%, advantageously 99 to 90%, of (A1);
0.5 to 20%, advantageously 0.5 to 10%, of (B);
0% of (A2),
the percentages being expressed by weight relative to the total weight of said tie.

According to one embodiment, the tie is characterized in that it comprises:
5 to 60%, advantageously 5 to 40%, of (A1);
0.5 to 20%, advantageously 0.5 to 10%, of (B);
94.5 to 40%, advantageously 94.5 to 60%, of (A2),
the percentages being expressed by weight relative to the total weight of said tie.

The invention also relates to a multilayer structure that includes at least one coextrusion tie layer defined above.

According to one embodiment, the structure is characterized in that it comprises the following successive layers: metal/epoxy resin/coextrusion tie/HDPE or MDPE.

Another subject of the invention is the use of the tie described above.

The invention also relates to the use of a coextrusion tie comprising at least one blend of high-density polyethylene (HDPE) (A1) with at least one propylene homopolymer or copolymer (B), said blend being grafted by a functional monomer and optionally diluted in ungrafted high-density polyethylene (HDPE) (A2):
the level of grafting of said coextrusion tie being >0.05 and <0.5%, preferably between 0.15% and 0.4%, the percentages being expressed as percentages by weight relative to the total weight of said tie; and
the density of said tie being between 0.940 and 0.980 g/cm$^3$, preferably between 0.940 and 0.960 g/cm$^3$, in multilayer structures comprising the following successive layers: metal/epoxy resin/said coextrusion tie/HDPE or MDPE.

According to one embodiment, the use is characterized in that (B) is EPR.

DETAILED DECRIPTION OF THE INVENTION

As regards the polyethylene (A1), this is chosen from polyethylene homopolymers or copolymers. The density of (A1) is between 0.940 and 0.980 g/cm$^3$, advantageously between 0.945 and 0.960 g/cm$^3$. (A1) is a high-density polyethylene (HDPE) and its MFI (melt flow index) at 190° C./2.16 kg is between 1 and 100 g/10 min, advantageously between 1 and 40 g/10 min.

By way of comonomers, mention may be made of:
α-olefins, advantageously those having from 3 to 30 carbon atoms. Examples are α-olefins having 3 to 30 carbon atoms as optional comonomers include: propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecane, 1-octadecene, 1-eicosene, 1-dodecene, 1-tetracocene, 1-hexacocene, 1-octacocene and 1-triacocene. These α-olefins may be used separately or as a blend of two or more of them;
esters of unsaturated carboxylic acids such as, for example, alkyl(meth)acrylates, the alkyls possibly having up to 24 carbon atoms. Examples of alkyl acrylates and methacrylates are in particular methyl methacrylate, ethyl acrylate, n-butyl acrylate, isobutyl acrylate and 2-ethylhexyl acrylate;
vinyl esters of saturated carboxylic acids such as, for example, vinyl acetate or vinyl propionate;
unsaturated epoxides. Examples of unsaturated epoxides are for example:
aliphatic glycidyl esters and ethers, such as allyl glycidyl ether, vinyl glycidyl ether, glycidyl maleate, glycidyl itaconate, glycidyl acrylate and glycidyl methacrylate; and
alicyclic glycidyl esters and ethers, such as 2-cyclohex-1-ene glycidyl ether, diglycidyl cyclohexene-4,5-carboxylate, glycidyl cyclohexene-4-carboxylate, glycidyl 2-methyl-5-noroborene-2-carboxylate and diglycidylendo-cis-bicyclo[2.2.1]hept-5-ene-2,3-dicarboxylate;
unsaturated carboxylic acids, their salts and their anhydrides. Examples of unsaturated dicarboxylic acid anhydrides are for example maleic anhydride, itaconic anhydride, citraconic anhydride and tetrahydrophthalic anhydride; and
dienes, such as for example 1,4-hexadiene.

(A1) may comprise several comonomers.

Advantageously, the polymer (A1), which may be a blend of several polymers, comprises at least 51 mol % and preferably 75 mol % of ethylene.

With regard to (A2), this is chosen from (A1) as defined above. Preferably, (A2) is identical to (A1). Unlike (A1), (A2) is not grafted. The MFI (at 190° C./2.16 kg) of A2 is <10 g/10 min, preferably <6 g/10 min, and even more preferably lying in succession between 6 and 1 g/10 min, between 6 and 2 g/10 min, between 6 and 3 g/10 min or even between 6 and 4 g/10 min.

With regard to (B), this is a polypropylene homopolymer or copolymer. As examples of comonomers, mention may be made of:
α-olefins, advantageously those having from 2 to 30 carbon atoms. Examples of such α-olefins are the same as for (A1) except that ethylene replaces propylene in the list;
dienes.

(B) may also be a polypropylene-block copolymer.

As examples of polymer (B), mention may be made of:
polypropylene;
polypropylene/EPDM or polypropylene/EPR blends.

It would not be outside the scope of the invention if (B) is an EPR or an EPDM.

Advantageously, the polymer (B), which may be a blend of several polymers, comprises at least 51 wt % and preferably 75 wt % propylene.

The density of (B) may be between 0.86 and 0.98 g/cm$^3$, advantageously between 0.860 and 0.920 g/cm$^3$. Its MFI is advantageously between 1 and 30 g/10 min.

When (A2) is absent in the tie, (A2)=0%:
the proportion of (A1) in the tie is between 99.5 and 80%, advantageously between 99 and 90%, by weight relative to the total weight of the tie; and
the proportion of (B) in the tie is between 0.5 and 20%, advantageously between 0.5 and 10%, by weight relative to the total weight of the tie.

When (A2) is present in the tie, (A2) ≠ 0%:
the proportion of (A1) in the tie is between 5 and 60%, advantageously between 5 and 40%, by weight relative to the total weight of the tie;
the proportion of (B) in the tie is between 0.5 and 20%, advantageously between 0.5 and 10%, by weight relative to the total weight of the tie; and
the proportion of (A2) in the tie is between 94.5 and 40%, advantageously between 94.5 and 60%, by weight relative to the total weight of the tie,
the total of the percentages making 100%.

The (A1)/(B) blend is grafted by a functional monomer. As examples of grafting monomers, mention may be made of carboxylic acids and their derivatives, acid chlorides, isocyanates, oxazolines, epoxides, amines and hydroxides.

Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids.

Unsaturated dicarboxylic acids having 4 to 10 carbon atoms and their functional derivatives, particularly their anhydrides, are particularly preferred grafting monomers. Maleic anhydride (MAH) is particularly preferred.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methyl-bicyclo[2.2.1]hept-5-ene-2,2-dicarboxylic anhydrides.

Examples of other grafting monomers comprise $C_1$-$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-mono-ethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate.

Various known processes may be used to graft a grafting monomer onto the blend of (A1) and (B).

For example, this may be carried out by heating the polymers to be grafted to high temperature, approximately 150° C. to approximately 300° C., in the presence or absence of a solvent and with or without a radical initiator. Suitable solvents that may be used in this reaction are benzene, toluene, xylene, chlorobenzene, cumene, inter alia. Suitable radical initiators which can be used comprise tert-butyl hydroperoxide, cumene hydroperoxide, diisopropylbenzene hydroperoxide, di-tert-butyl peroxide, tert-butylcumyl peroxide, dicumyl peroxide, 1,3-bis(tert-butylperoxyisopropyl)benzene, acetyl peroxide, benzoyl peroxide, isobutyryl peroxide, bis(3,5,5-trimethylhexanoyl) peroxide and methyl ethyl ketone peroxide.

In the graft-modified blend obtained in the abovementioned manner, the amount of grafting monomer is chosen so as to be suitable for obtaining, after the grafting or, as the case may be, after dilution, a level of grafting <0.5%, preferably >0.05% and <0.5%, more advantageously <0.4% and even more advantageously >0.10% and <0.4%, by weight of graft relative to the total weight of the tie.

The amount of grafted monomer is determined by assaying the succinic functional groups by FTIR spectroscopy.

The tie of the invention may also include various additives, such as antioxidants, ultraviolet absorbers, antistatic agents, pigments, dyes, nucleating agents, fillers, slip agents, lubricants, fire retardants and antiblocking agents.

Examples of antioxidants are 2,6-di-tert-butyl-p-cresol, o-tert-butyl-p-cresol, tetrakis[3-methylene(3,5-di-tert-butyl-4-hydroxyphenyl)propionate]methane, p-naphthylamine and para-phenylenediamine.

Examples of ultraviolet absorbers are 2,4-dihydroxybenzophenone, 2-(2'-hydroxy-3',5'-di-tert-butylphenyl)-5-chlorobenzotriazole, 2-(2-hydroxy-3-tert-butyl-5-methylphenyl)-5-chlorobenzotriazole and bis(2,2',6,6')tetramethyl-4-piperidine)sebacate.

Examples of antistatic agents are lauryldiethanolamine, palmityldiethanolamine, stearyldiethanolamine, oleyl-diethanolamine, behenyldiethanolamine, polyoxyethylenealkylamines, stearyl monoglyceride and 2-hydroxy-4-n-octoxybenzophenone.

Examples of colorants comprising pigments and dyes are carbon black, titanium white, cadmium yellow and copper phthalocyanine blue.

Examples of nucleating agents are aluminium p-tert-butylbenzoate, dibenzylidene sorbitol and aluminium hydroxyl-di-p-tert-butylbenzoate.

Examples of fillers are glass fibers, carbon fibers, talc, clay, silica, calcium carbonate, barium sulfate, magnesium hydroxide, calcium hydroxide and calcium oxide.

Examples of slip agents are stearamide, oleamide and erucinamide.

Examples of lubricants are calcium stearate, zinc stearate, aluminium stearate, magnesium stearate and polyethylene wax.

Examples of fire retardants are antimony oxide, decabromobiphenyl ether and bis(3,5-dibromo-4-bromopropyloxyphenyl) sulfone.

Examples of antiblocking agents are silicon dioxide and polystyrene.

The amounts of these other additives may be chosen from the appropriate amounts that do not have an unfavorable effect on the ties of the invention. For example, with respect of the total weight of (A1) and (B), the appropriate amounts are: about 0.1 to 5% by weight for the antioxidants; about 0.01 to 5% by weight for the ultraviolet absorbers; about 0.01 to 1% by weight for the antistatic agents; about 0.01 to 5% by weight for the colorants; about 0.01 to 5% by weight for the nucleating agents; about 0.1 to 60% by weight of the fillers; about 0.01 to 1% by weight for the slip agents; about 0.01 to 1% by weight for the lubricants; about 0.1 to 50% by weight for the fire retardants; and about 0.01 to 30% by weight for the antiblocking agents.

The multilayer structure of the present invention is formed from the layer that includes the above tie and from a layer of an oxygen-containing or nitrogen-containing polar resin or of a mineral oxide deposited on a polymer, such as PE, PET, or EVOH, or a metal layer.

Examples of preferred polar resins in the layer other than the tie are polyamide resins, a saponified ethylene/vinyl acetate copolymer, polyesters and epoxy resins.

More specifically, they comprise long-chain synthetic polyamides having structural units of the amide group in the main chain, such as PA-6, PA-6,6, PA-6,10 and PA-11 and PA-12; a saponified ethylene/vinyl acetate copolymer having a degree of saponification of about 90 to 100 mol %, obtained by saponifying an ethylene/vinyl acetate copolymer having an ethylene content of about 15 to about 60 mol %; polyesters, such as polyethylene terephthalate, polybutylene terephthalate, polyethylene naphthenate, epoxy resins, etc. and blends of these resins. The epoxy resins are used in powder or liquid form.

The mineral oxide layer may for example be a layer of silica, deposited on a PE, PET or EVOH layer. The structure of the invention therefore comprises, respectively: a tie layer, an $SiO_2$ (or $SiO_x$) layer and either a PE, PET or EVOH layer or a metal layer.

The metal layer may for example be a sheet, film or foil of a metal such as aluminum, iron, copper, tin and nickel, or an alloy containing at least one of these metals as main constituent. The thickness of the film or foil may be suitably chosen and is for example from about 0.01 to about 0.2 mm. It is common practice to degrease the surface of the metal layer before the tie of the invention is laminated to it.

It would not be outside the scope of the invention if the above structure were to be combined with other layers. One advantageous structure is that comprising the following layers: metal/epoxy/tie/HDPE or MDPE.

The invention also relates to the above structure combined on the tie side with a polyolefin-based layer (F). The polyolefin (F) is a high-density or medium-density polyethylene (HDPE or MDPE) and is preferably a high-density polyethylene.

These structures are also useful for making packaging, for example rigid hollow bodies, such as flasks or bottles, or flexible pouches, or multilayer films. Mention may also be made of materials comprising a polyamide (PA) film and a polyethylene (PE) film, it being possible for the polyethylene film to be laminated to the polyamide film or coextruded with the polyamide. The coextrusion tie is deposited between the polyethylene and the polyamide for good adhesion of the PA to the PE. These multilayer materials may be PE/tie/EVOH three-layer structures in which EVOH denotes an ethylene/vinyl alcohol copolymer or a partly or completely saponified ethylene/vinyl acetate (EVA) copolymer or PE/tie/EVOH/tie/PE five-layer structures.

The ties of the invention are useful for the following structures:
PE/tie/EVOH/tie/PE (PE denotes polyethylene);
PE/tie/EVOH;
PE/tie/PA;
PP/tie/PA;
PP/tie/EVOH/tie/PP (PP denotes polypropylene).

The structures and packaging may be manufactured by coextrusion, by lamination, by extrusion-blow molding, or by powder coating of some type (electrostatic, powder deposition) on a hot support or a support undergoing a heating step.

The invention will now be exemplified by ties (examples 1-3 and comparative examples 1-3) produced as defined in Table 1 below:

TABLE 1

| | A1 | | | B | | A2 | | | |
|---|---|---|---|---|---|---|---|---|---|
| | Relative density | MFI (190° C./ 2.16 kg) | Overall content (by wt) | MFI (230° C./ 2.16 kg) | Overall content (by wt) | Relative density | MFI 190° C./ 2.16 kg) | Overall content (by wt) | Overall grafted MAH content |
| Ex1 | 0.954 | 20 | 22.5% | 8 | 7.5% | 0.953 | 4.5 | 70% | 0.20) |
| Ex2 | 0.954 | 20 | 12% | 7 | 3% | 0.953 | 4.5 | 85% | 0.34% |
| Ex3 | 0.954 | 4.3 | 98% | 7 | 2% | / | / | / | 0.36% |
| Cp1 | 0.954 | 20 | 12.75% | 8 | 2.25% | 0.92 | 3.6 | 85% | 0.28% |
| Cp2 | 0.91 | 6 | 12.75% | 8 | 2.25% | 0.953 | 4.5 | 85% | 0.25% |
| Cp3 | 0.917 | 3.3 | 12.75% | 8 | 2.25% | 0.92 | 3.6 | 85% | 0.24% |

For Ex1, CP1, Cp2 and Cp3, (B) is a homopolymer.
For Ex2 and Ex3, (B) is an impact PP copolymer.

Steel pipes were coated under the following conditions in order to form structures of the metal/epoxy/tie/HDPE type:
Shot-peening of the type:
surface finish: 21/2 Sa;
roughness $R_z$: 70-80 μm;
Induction heating of the pipe: 180 to 220° C.;
Application of the epoxy primer (EUROKOTE 714-41) by electrostatic powder coating;
Extrusion of the tie with an epoxy/tie time of 24 seconds;
tie/top coat time: 30 s;
top coat/cooling time: 30 s;
Cooling by a water shower with an epoxy/cooling time of 3 min in order to ensure complete crosslinking of the epoxy;
Extrusion of HDPE after the tie.
EUROKOTE 714-41 denotes an epoxy resin having a $T_g$ of 105°, supplied by the company BITUMES SPECIAUX and having the following properties:
relative density at 23° C. (NFT 30-043): 1.5±0.05 g/ml;
moisture content (IBS 319): <0.50%;
particle size distribution (IBS 316): median diameter: 38±4 μm; 96 μm oversize <10%;
$T_g$ (NFA 49-706): 105±5° C.;
gel time: 25±10 s at 180° C. and 9±3 s at 220° C.
The thicknesses of the layers were, in succession:
epoxy layer: 110 μm;
tie layer: 250 μm;
external layer (HDPE): 2.5 mm.

Peel force measurements were carried out according to DIN 30670 and gave the results given below in Table 2.

TABLE 2

| | Peel force at 23° C. (N/cm) | Peel force at 80° C. (N/cm) |
|---|---|---|
| Ex1 | Unpeelable | 164 |
| Ex2 | Unpeelable | 161 |
| Ex3 | Unpeelable | 182 |
| Cp1 | 223 | 73 |
| Cp2 | 87 | 14 |
| Cp3 | 242 | 41 |

The invention claimed is:

1. A coextrusion tie comprising a blend of at least one ethylene homopolymer or copolymer (A1) of density between 0.940 and 0.980 g/cm³ with at least one propylene homopolymer or copolymer (B) comprising at least 75 wt% propylene, said blend being grafted by a functional monomer and optionally diluted in an ungrafted ethylene homopolymer or copolymer (A2) of density between 0.940 and 0.980 g/cm³;
the level of grafting of said coextrusion tie being <0.5% by weight relative to the total weight of said tie; and
the density of said tie being between 0.940 and 0.980 g/cm³.

2. The tie as claimed in claim 1, wherein the level of grafting is >0.05% and <0.5% by weight relative to the total weight of said tie.

3. The tie as claimed in claim 1, wherein the level of grafting is <0.4% by weight relative to the total weight of said tie.

4. The tie as claimed in claim 1, wherein the level of grafting is >0.10% and <0.4% by weight relative to the total weight of said tie.

5. The tie as claimed in claim 1, wherein the density of (A1) and/or of (A2) is between 0.945 and 0.960 g/cm³.

6. The tie as claimed in claim 1, wherein the density of (B) is between 0.860 and 0.920 g/cm³.

7. The tie as claimed in claim 1, wherein (A1) and (A2) are the same polymers.

8. The tie as claimed in claim 1, wherein said tie comprises:
99.5 to 80%, of (A1);
0.5 to 20%, of (B);
0% of (A2),
the percentages being expressed by weight relative to the total weight of said tie.

9. The tie as claimed in claim 8, wherein said tie comprises:
99 to 90%, of (A1);
0.5 to 10%, of (B);
0% of (A2),
the percentages being expressed by weight relative to the total weight of said tie.

10. The tie as claimed in claim 1, wherein said tie comprises:
5 to 60%, of (A1);
0.5 to 20%, of (B);
94.5 to 40%, of (A2),
the percentages being expressed by weight relative to the total weight of said tie.

11. The tie as claimed in claim 10, wherein said tie comprises:
5 to 40%, of (A1);
0.5 to 10%, of (B);
94.5 to 60%, of (A2),
the percentages being expressed by weight relative to the total weight of said tie.

12. The tie as claimed in claim 1, wherein the coextrusion tie comprises a coextrusion tie layer as at least one layer in a multilayer structure.

13. The tie as claimed in claim 12, wherein the multilayer structure comprises the following successive layers: metal/epoxy resin/the coextrusion tie layer/HDPE or MDPE.

* * * * *